(12) United States Patent
Otsuka (10) Patent No.: US 10,574,169 B2
(45) Date of Patent: Feb. 25, 2020

(54) MOTOR DRIVING DEVICE (71) Applicant: DENSO CORPORATION, Kariya-shi, Aichi (JP)

(72) Inventor: Hikaru Otsuka, Kosai (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/080,768

(22) PCT Filed: Mar. 2, 2017

(86) PCT No.: PCT/JP2017/008361
§ 371 (c)(1),
(2) Date: Aug. 29, 2018

(87) PCT Pub. No.: WO2017/150689
PCT Pub. Date: Sep. 8, 2017

(65) Prior Publication Data
US 2019/0089285 A1 Mar. 21, 2019

(30) Foreign Application Priority Data

Mar. 3, 2016 (JP) ................................ 2016-041398

(51) Int. Cl.
*H02P 27/08* (2006.01)
*H02P 27/06* (2006.01)
(Continued)

(52) U.S. Cl.
CPC ....... *H02P 27/085* (2013.01); *B60H 1/00428* (2013.01); *B60H 1/00642* (2013.01); *H02P 27/045* (2013.01); *H02P 27/06* (2013.01)

(58) Field of Classification Search
None
See application file for complete search history.

(56) References Cited

U.S. PATENT DOCUMENTS

| 4,510,430 A | * | 4/1985 | Ashikaga | ................ H02P 21/36 318/800 |
| 6,028,405 A | * | 2/2000 | Kume | ................... H02M 1/126 318/400.24 |

(Continued)

FOREIGN PATENT DOCUMENTS

| JP | 2012-130099 A | 7/2012 |
| JP | 2013-46488 A | 3/2013 |
| JP | 2013-62933 A | 4/2013 |

OTHER PUBLICATIONS

May 16, 2017 International Search Report issued in International Patent Application No. PCT/JP2017/008361.

*Primary Examiner* — Bentsu Ro
(74) *Attorney, Agent, or Firm* — Oliff PLC (57) ABSTRACT

API duty calculation unit of a microcomputer that performs control at a predetermined control period calculates a duty ratio of a voltage applied to a coil of a motor from a target rotation speed and an actual rotation speed calculated by a number-of-rotation information unit. The PI duty calculation unit generates a rectangular wave signal having a period according to one frequency selected from plural predetermined frequencies together with the start of one control period and indicating the calculated duty ratio, and outputs the rectangular wave signal to a PWM duty calculation unit. The PWM duty calculation unit generates a PWM signal for controlling an inverter circuit based on the rectangular wave signal output by the PI duty calculation unit and position information of a rotor of the motor calculated by an electrical angle position information unit.

10 Claims, 8 Drawing Sheets

(51) Int. Cl.
*B60H 1/00* (2006.01)
*H02P 27/04* (2016.01)

(56) References Cited

U.S. PATENT DOCUMENTS

2004/0012353 A1\* 1/2004 Seima ........................ H02P 1/40
                                                                                                       318/432

2014/0001999 A1 1/2014 Sato

\* cited by examiner

MOTOR DRIVING DEVICE

TECHNICAL FIELD

The present invention relates to a motor driving device.

BACKGROUND ART

A control device of a brushless DC motor (hereinafter abbreviated as a "motor") used for a blower motor or the like of a vehicle air conditioner causes an inverter circuit to generate a voltage having a duty ratio corresponding to a target rotation speed, and applies the generated voltage to a coil of the motor.

An inverter circuit 40 includes a switching element. The inverter circuit 40 generates a voltage to be applied to the coil of the motor by a pulse width modulation (PWM) that adjusts a voltage by turning on and off the switching element to modulate a DC voltage of a power supply into a pulsed waveform. However, noise may be generated from the motor according to the PWM control.

In order to suppress the noise caused by the PWM, spread spectrum that sequentially changes one cycle of the waveform of the voltage generated by the PWM is effective. In order to change one cycle of the waveform of the voltage, a carrier frequency related to the generation of the PWM signal for turning on and off the switching element is changed. By changing the carrier frequency, the noise from the motor due to the PWM varies every short time and uniformly diffuses, such that the noise from the motor is reduced.

Figure 8A:
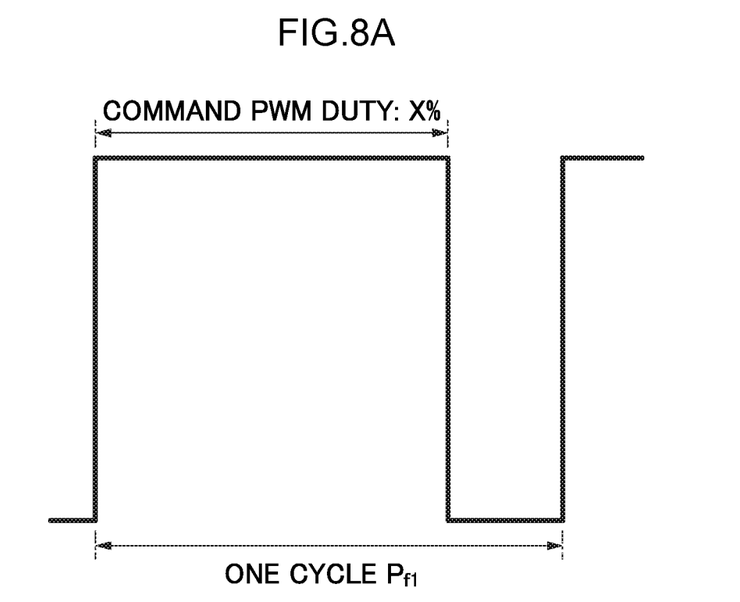
FIG. 8A is an explanatory diagram showing a case in which one period of a PWM is long.
Figure 8B:
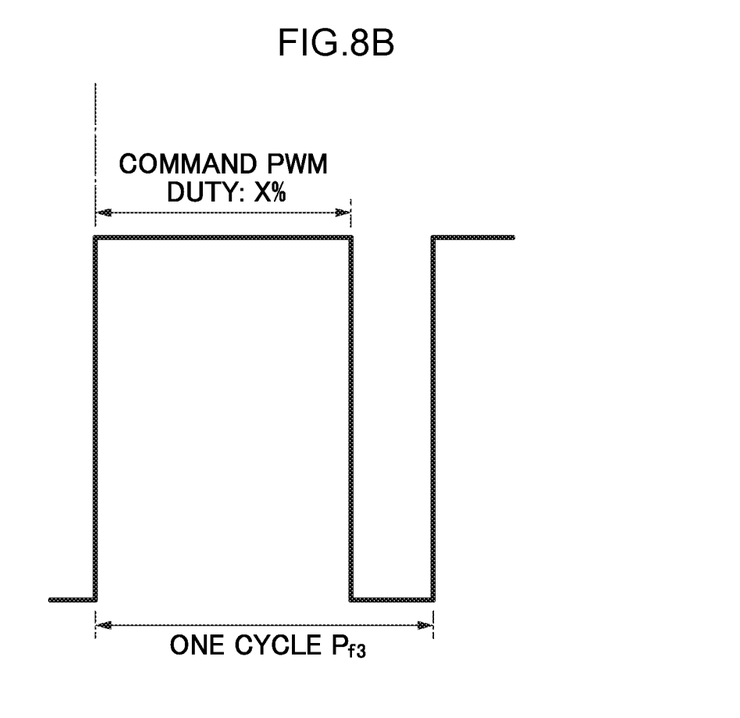
FIG. 8B is an explanatory diagram showing a case in which one period of a PWM is short.

Even when one cycle of the waveform of the voltage changes, if a duty ratio that is a ratio of the time of one pulse generated by turning on the switching element to one cycle of the waveform of the voltage is the same, an effective value of the voltage applied to the coil of the motor does not change in theory. FIG. 8A shows a case in which one period of a PWM is long, and FIG. 8B shows a case in which one period of a PWM is short. However, since the duty ratios are all X %, the effective value of the voltage applied to the coil of the motor is theoretically the same.

Japanese Patent Application Laid-Open (JP-A) No. 2013-62933 discloses an invention of an electric compressor in which, when a PWM signal is generated from a signal wave and a carrier wave, a carrier frequency of the PWM signal is randomly switched by spread spectrum.

SUMMARY OF INVENTION

Technical Problem

However, in the technique described in JP-A No. 2013-62933, an integrated circuit dedicated to spread spectrum is separately required, and the number of components to be mounted increases. Hence, there is a problem that a manufacturing cost of a product increases. Further, in order to mount the integrated circuit dedicated to spread spectrum, it is necessary to change a circuit of a motor driving device, and there is a problem that it takes time and labor to change the circuit.

Embodiments of the invention have been made in view of the above fact, and it is an object of the invention to provide a motor driving device capable of sequentially changing a carrier frequency of a PWM without requiring modification of an existing circuit.

Solution to Problem

In order to solve the above problem, the present disclosure includes: a driving unit that includes a plurality of switching elements, each of which is on or off controlled by a pulse width modulation signal, and that drives a motor with a driving voltage according to an on or off state of the plurality of switching elements; and a control unit that repeatedly operates at a predetermined cycle, that generates a pulse width modulation signal based on a command signal and a signal selected from a plurality of predetermined signals having different frequencies at the start of operation, and that controls the on or off state of the plurality of switching elements of the driving unit by using the generated pulse width modulation signal.

This motor driving device generates the pulse width modulation signal based on the command signal at the cycle according to one frequency selected from signals having a plurality of predetermined frequencies. Since the process of selecting the signal of one frequency from the predetermined frequencies can be performed by changing a program of the control unit, it is possible to sequentially change the carrier frequency of the PWM without requiring the modification of the existing circuit.

In addition, the control unit sequentially selects one different signal from the plurality of predetermined signals and, after selecting a last one of the plurality of predetermined signals, repeats to sequentially select one different signal.

The process of selecting one signal by avoiding the overlap of frequencies from a plurality of signals is possible by changing the program of the control unit. Therefore, according to the motor driving device, it is possible to sequentially change the carrier frequency of the PWM without requiring the modification of the existing circuit.

In addition, the control unit randomly selects one signal from the plurality of predetermined signals.

The process of randomly selecting one signal from a plurality of signals is possible by changing the program of the control unit. Therefore, according to the motor driving device, it is possible to sequentially change the carrier frequency of the PWM without requiring the modification of the existing circuit.

In addition, the control unit determines one of the plurality of predetermined signals as a reference signal and corrects a pulse width modulation signal generated based on a signal other than the reference signal, such that a driving voltage generated by using the pulse width modulation signal based on the signal other than the reference signal becomes equal to a driving voltage generated by using a pulse width modulation signal based on the reference signal.

According to the motor driving device, even when the effective value of the voltage applied to the motor changes due to the change in the carrier frequency of the PWM, the same voltage as the PWM due to the reference frequency can be applied to the motor, and thus the rotation of the motor can be controlled smoothly.

In addition, the control unit corrects the pulse width modulation signal based on the signal other than the reference signal, such that substantial values become equal, the substantial values being the pulse width modulation signal based on the reference signal and the pulse width modulation signal based on the signal other than the reference signal from each of which an influence of dead time is excluded.

According to the motor driving device, even when the effective value of the voltage applied to the motor changes when the carrier frequency of the PWM changed due to the influence of the dead time, the same voltage as the PWM due to the reference frequency can be applied to the motor, and thus the rotation of the motor can be controlled smoothly.

In addition, the motor driving device includes a rotation speed detection unit that detects a rotation speed of the motor, and the control unit calculates a driving voltage of the motor so as to eliminate a deviation between a target rotation speed indicated by the command signal and an actual rotation speed of the motor detected by the rotation speed detection unit.

According to the motor driving device, the driving voltage is calculated by a proportional-integral (PI) controller that eliminates the deviation between the rotation speed indicated by the command signal and the actual rotation speed of the motor, and thus it is possible to control the rotation speed of the motor in consideration of the actual rotation speed of the motor.

DESCRIPTION OF EMBODIMENTS

First Embodiment

Figure 1:
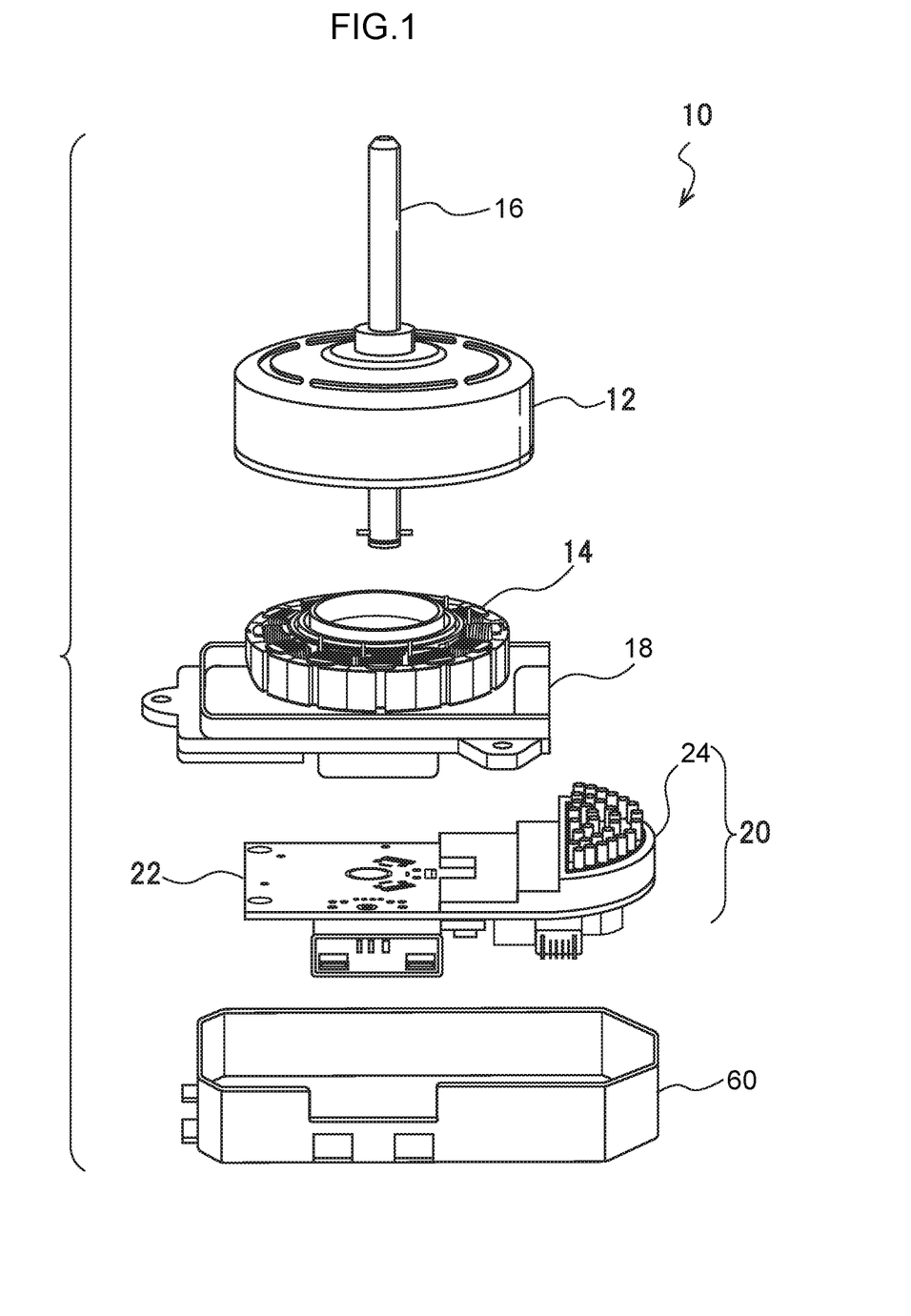
FIG. 1 is a schematic diagram showing a configuration of a motor unit using a motor driving device according to a first embodiment.

FIG. 1 is a schematic diagram showing a configuration of a motor unit 10 using a motor driving device 20 according to the present embodiment. The motor unit 10 of FIG. 1 according to the present embodiment is a unit of a so-called blower motor used for blowing air in an in-vehicle air conditioner as an example.

The motor unit 10 according to the present embodiment relates to a three-phase motor of an outer rotor structure in which a rotor 12 is provided outside a stator 14. The stator 14 is an electromagnet in which a conductive wire is wound around a core member, and constitutes three phases of a U-phase, a V-phase, and a W-phase. Each of the U-phase, the V-phase, and the W-phase of the stator 14 generates a so-called rotating magnetic field by switching the polarity of the magnetic field generated by the electromagnet under the control of the motor driving device 20 described later.

A rotor magnet is provided on the inner side (not shown) of the rotor 12, and the rotor magnet rotates the rotor 12 by corresponding to the rotating magnetic field generated by the stator 14. A shaft 16 is provided in the rotor 12 and rotates integrally with the rotor 12. Although not shown in FIG. 1, in the present embodiment, a multi-blade fan such as a so-called sirocco fan is provided in the shaft 16, and the multi-blade fan rotates together with the shaft 16, such that air can be blown in the in-vehicle air conditioner.

The stator 14 is attached to the motor driving device 20 through an upper case 18. The motor driving device 20 includes a substrate 22 of the motor driving device 20 and a heat sink 24 that dissipates heat generated from elements on the substrate 22. A lower case 60 is attached to the motor unit 10 including the rotor 12, the stator 14, and the motor driving device 20.

Figure 2:
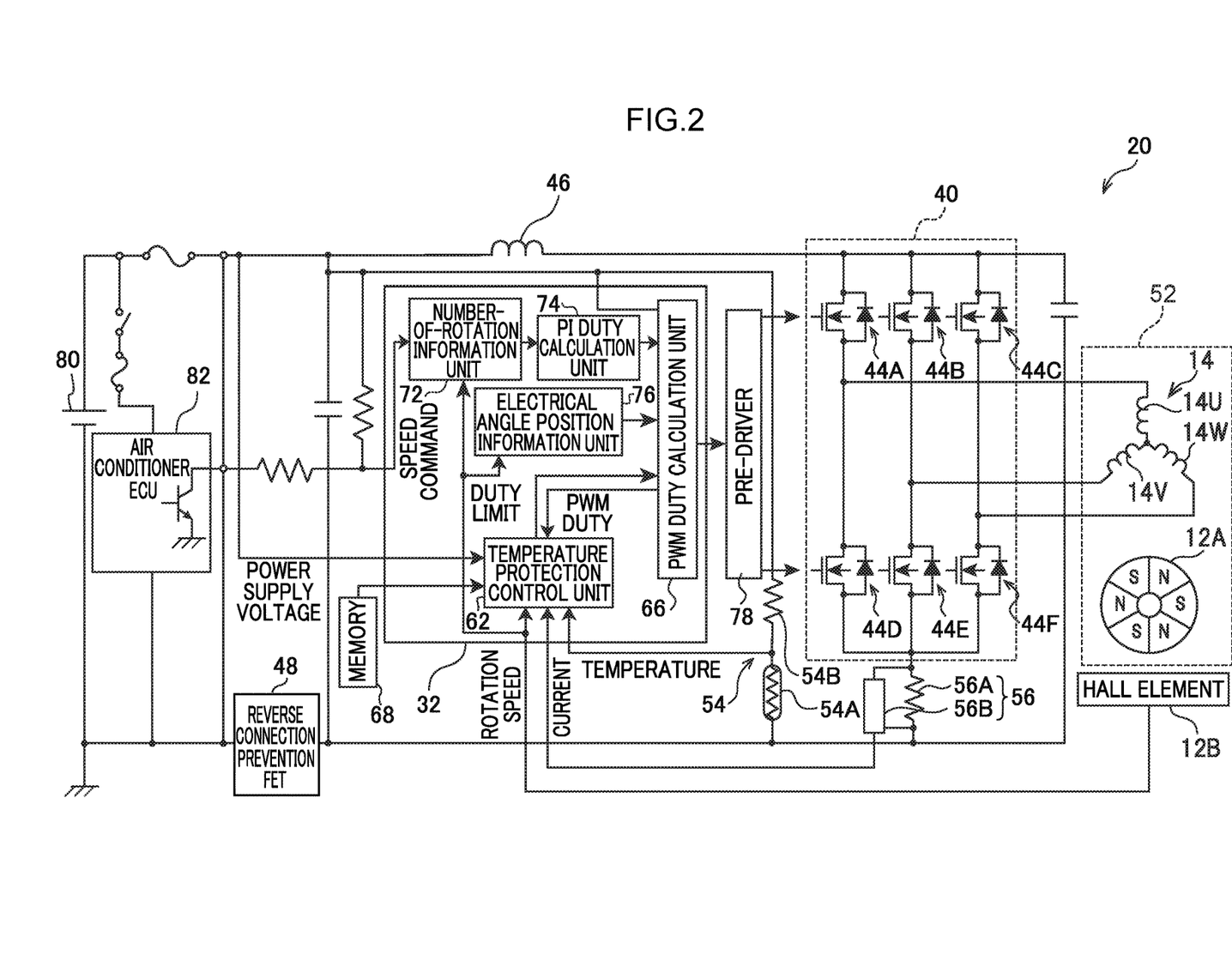
FIG. 2 is a diagram schematically showing the motor driving device according to the first embodiment.

FIG. 2 is a diagram schematically showing the motor driving device 20 according to the present embodiment. The inverter circuit 40 switches power to be supplied to a coil of a stator 14 of a motor 52. For example, inverter FETs 44A and 44D perform switching of power supplied to a U-phase coil 14U, inverter FETs 44B and 44E perform switching of power supplied to a V-phase coil 14V, and inverter FETs 44C and 44F perform switching power supplied to a W-phase coil 14W.

Drains of the inverter FETs 44A, 44B, and 44C are connected to a positive electrode of an in-vehicle battery 80 through a noise removal choke coil 46. In addition, sources of the inverter FETs 44D, 44E, and 44F are connected to a negative electrode of the battery 80 through a reverse connection prevention FET 48.

In the present embodiment, a Hall element 12B detects a magnetic field of a rotor magnet 12A or a sensor magnet provided coaxially with the shaft 16. A microcomputer 32 detects a rotation speed and a position (rotation position) of the rotor 12 based on the magnetic field detected by the Hall element 12B and controls the switching of the inverter circuit 40 according to the rotation speed and the rotation position of the rotor 12.

A command signal is input to the microcomputer 32. The command signal includes a speed command value related to a rotation speed of the rotor 12 from an air conditioner ECU 82 that controls the air conditioner according to the switch operation of the air conditioner. In addition, the microcomputer 32 is connected to a voltage division circuit 54 including a thermistor 54A and a resistor 54B, and a current detection unit 56 provided between the inverter circuit 40 and the negative electrode of the battery 80.

Since a resistance value of the thermistor 54A constituting the voltage division circuit 54 changes according to the temperature of the substrate 22 of the circuit, a voltage of a signal output from the voltage division circuit 54 changes according to the temperature of the substrate 22. The microcomputer 32 calculates the temperature of the substrate 22 based on the change in the voltage of the signal output from the voltage division circuit 54.

The current detection unit 56 includes a shunt resistor 56A that has a resistance value of about from 0.2 mΩ to several Ω, and an amplifier 56B that amplifies a potential difference between both ends of the shunt resistor 56A and outputs a voltage value proportional to a current of the shunt resistor 56A as a signal. The signal output from the amplifier 56B is input to a temperature protection control unit 62 of the microcomputer 32. The temperature protection control unit 62 calculates the current of the inverter circuit 40 based on the signal output from the amplifier 56B.

In the present embodiment, the signal from the voltage division circuit 54 including the thermistor 54A, the signal output from the current detection unit 56, and the signal output from the Hall element 12B are input to the temperature protection control unit 62 of the microcomputer 32. The temperature protection control unit 62 calculates the temperature of the element of the substrate 22, the current of the inverter circuit 40, and the like, based on the input signals. In addition, the battery 80 that is a power source is connected to the temperature protection control unit 62, and the temperature protection control unit 62 detects the voltage of the battery 80 as a power supply voltage value.

An SI signal that is the command signal from the air conditioner ECU 82 is input to a number-of-rotation information unit 72 of the microcomputer 32, and a target rotation speed based on the SI signal is calculated. The signal output from the Hall element 12B is also input to the number-of-rotation information unit 72, and an actual rotation speed of the rotor 12 is calculated. The number-of-rotation information unit 72 outputs information about the calculated target rotation speed and the actual rotation speed to a PI duty calculation unit 74.

The PI duty calculation unit 74 calculates, by a so-called PI controller, the duty ratio of the voltage applied to the coil of the stator 14 from the target rotation speed and the actual rotation speed, which are calculated by the number-of-rotation information unit 72, when the actual rotation speed is changed to the target rotation speed. The PI duty calculation unit 74 calculates the duty ratio of the voltage at the target rotation speed based on the proportional relationship between the deviation between the target rotation speed and the actual rotation speed and the deviation between the voltage at the target rotation speed and the voltage at the actual rotation speed. In addition, when a residual deviation occurs only with the proportional relationship described above, the PI duty calculation unit 74 eliminates such residual deviation by deviation integration. The PI duty calculation unit 74 generates a rectangular wave signal indicating the calculated duty ratio and outputs the rectangular wave signal to a PWM duty calculation unit 66.

The signal output from the Hall element 12B is also input to an electrical angle position information unit 76, and the position of the rotor 12 is calculated. Position information of the rotor 12 calculated by the electrical angle position information unit 76 is output to the PWM duty calculation unit 66.

The PWM duty calculation unit 66 generates the PWM signal based on the rectangular wave signal generated by the PI duty calculation unit 74 and the position information of the rotor 12 calculated by the electrical angle position information unit 76. Specifically, the phase of the rectangular wave signal generated by the PI duty calculation unit 74 is synchronized with the position information of the rotor 12 calculated by the electrical angle position information unit 76. The PWM duty calculation unit 66 outputs the generated PWM signal to a pre-driver 78. The pre-driver 78 amplifies the input PWM signal to generate an FET gate signal, and applies the FET gate signal to gates of the inverter FETs 44A to 44F of the inverter circuit 40.

The PWM signal calculated by the PWM duty calculation unit 66 is input to the temperature protection control unit 62. The temperature protection control unit 62 determines whether or not the duty ratio of the PWM signal calculated by the PWM duty calculation unit 66 is appropriate, based on the temperature of the element of the substrate 22, the rotation speed of the rotor 12, and the loads of the motor 52 and the circuit of the motor driving device 20. When the duty ratio of the PWM signal calculated by the PWM duty calculation unit 66 is excessive, the temperature protection control unit 62 corrects the duty ratio of the PWM signal and feeds the corrected duty ratio back to the PWM duty calculation unit 66. The loads of the motor and the circuit are, for example, the current or the power supply voltage of the inverter circuit 40.

In addition, a memory 68 that is a storage device is connected to the temperature protection control unit 62. The memory 68 stores a limit value and the like for limiting the duty ratio when the motor 52 and the circuit are overloaded.

Figure 3:
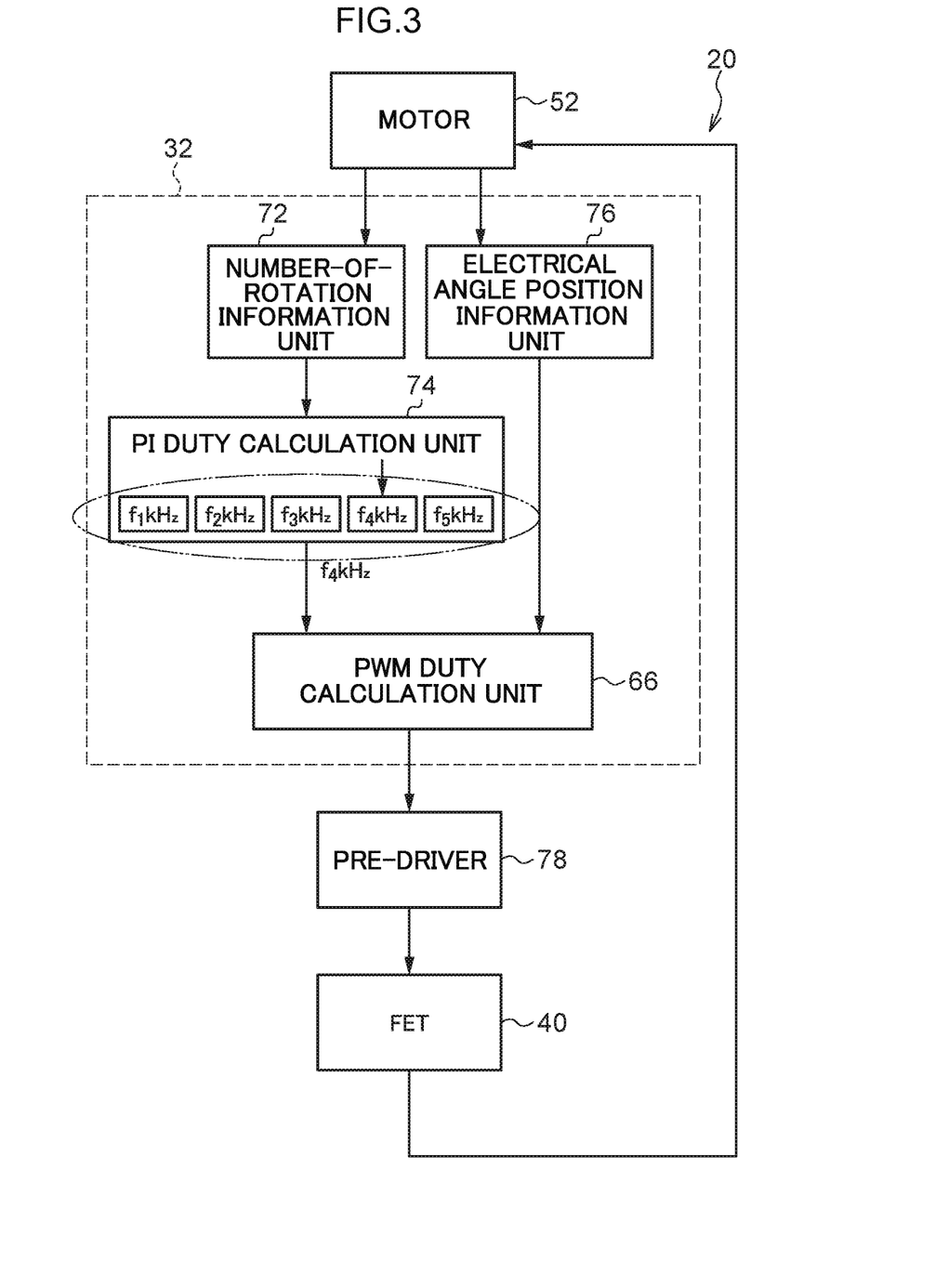
FIG. 3 is a functional block diagram of the motor driving device according to the first embodiment.

FIG. 3 is a functional block diagram of the motor driving device 20 according to the present embodiment. Although not shown, an SI signal that is a command signal of the rotation speed is input from the air conditioner ECU 82 to the number-of-rotation information unit 72. The target speed calculation unit 64A calculates the target rotation speed of the motor 52 from the input SI signal.

The actual rotation speed that is the actual rotation speed of the motor 52 is calculated by the number-of-rotation information unit 72 from the signal corresponding to the magnetic field of the sensor magnet or the rotor magnet 12A detected by the Hall element 12B. The actual rotation speed calculated by the number-of-rotation information unit 72 is input to the PI duty calculation unit 74 together with the target rotation speed calculated by the number-of-rotation information unit 72.

The PI duty calculation unit 74 calculates the duty ratio of the voltage applied to the coil of the stator 14 by the PI controller, such that the deviation between the target rotation speed and the actual rotation speed calculated by the number-of-rotation information unit 72 is eliminated. In addition, the PI duty calculation unit 74 generates the rectangular wave signal having the period according to the carrier frequency and indicating the duty ratio calculated by the PI controller.

The PI duty calculation unit 74 changes the carrier frequency related to the generation of the rectangular wave signal for each control period of the microcomputer 32. In the present embodiment, the carrier frequency of the PWM signal is changed in, for example, five stages of $f_1$ kHz, $f_2$ kHz, $f_3$ kHz, $f_4$ kHz, and $f_5$ kHz. In the present embodiment, signals of one frequency are sequentially selected from $f_1$ kHz, $f_2$ kHz, $f_3$ kHz, $f_4$ kHz, and $f_5$ kHz such that the frequencies do not overlap. After selecting the last one among $f_1$ kHz, $f_2$ kHz, $f_3$ kHz, $f_4$ kHz, and $f_5$ kHz, sequentially selecting signals of one frequency so as not to overlap the signal of the first selected frequency is repeated.

For example, for each control period of the microcomputer 32, the frequency change mode is selected and changed in the order from a low frequency to a high frequency, such as $f_1$ kHz→$f_2$ kHz→$f_3$ kHz→$f_4$ kHz→$f_5$ kHz. The lowest frequency $f_1$ kHz is selected in the control period following the control period in which the highest frequency $f_5$ kHz is selected, and then the frequency is changed from a low frequency to a high frequency again.

It may be changed by selecting the frequency in the order from a high frequency to a low frequency, such as $f_5$ kHz→$f_4$ kHz→$f_3$ kHz→$f_2$ kHz→$f_1$ kHz. The highest frequency $f_5$ kHz is selected in the control period following the control period in which the lowest frequency $f_1$ kHz is selected, and then the frequency is changed from a high frequency to a low frequency again.

Alternatively, in the control period following the control period in which the highest frequency $f_5$ kHz is selected, one frequency is selected in the order from $f_4$ kHz, which is the second highest frequency after $f_5$ kHz, to a lowest frequency, and in the control period following the control period in which the lowest frequency $f_1$ kHz is selected, one frequency is selected in the order from a frequency, which is the next lowest frequency after $f_1$ kHz, to a high frequency.

Further, the frequency may be changed by randomly selecting the frequency from $f_1$ kHz, $f_2$ kHz, $f_3$ kHz, $f_4$ kHz, and $f_5$ kHz for each control period of the microcomputer 32.

In FIG. 3, the PI duty calculation unit 74 selects a frequency of $f_4$ kHz and generates a rectangular wave signal indicating the duty ratio calculated by the PI controller. The rectangular wave signal generated by the PI duty calculation unit 74 is output to the PWM duty calculation unit 66.

The generation of the rectangular wave signal indicating the duty ratio calculated by the PI controller by the PI duty calculation unit 74 is based on a known technique, and a signal of a carrier wave the waveform of which is a triangular wave and a signal indicating a duty ratio calculated by PI controller are compared by using a circuit such as a comparator. For example, a high level signal when the signal indicating the duty ratio with respect to the signal of the carrier wave is small and a low level signal when the signal indicating the duty ratio with respect to the signal of the carrier wave is large are output from a circuit such as a comparator, thereby generating the rectangular wave signal having the period according to the carrier frequency and indicating the duty ratio calculated by the PI controller.

As described above, the signal output from the Hall element 12B is also input to the electrical angle position information unit 76, and the position of the rotor 12 is calculated. Position information of the rotor 12 calculated by the electrical angle position information unit 76 is output to the PWM duty calculation unit 66.

The PWM duty calculation unit 66 generates the PWM signal for controlling the inverter circuit 40, based on the rectangular wave signal generated by the PI duty calculation unit 74 and the position information of the rotor 12 calculated by the electrical angle position information unit 76, and outputs the PWM signal to the pre-driver 78. The pre-driver 78 amplifies the input PWM signal, generates an FET gate signal for switching each of the inverter FETs 44A to 44F, and applies the FET gate signal to the gate of each of the inverter FETs 44A to 44F.

The inverter circuit 40, which is a three-phase inverter, switches the inverter FETs 44A to 44F according to the FET gate signal output from the pre-driver 78, and generates the voltage to be applied to the coil of the motor 52 from the power supplied from the battery 80.

Figure 4:
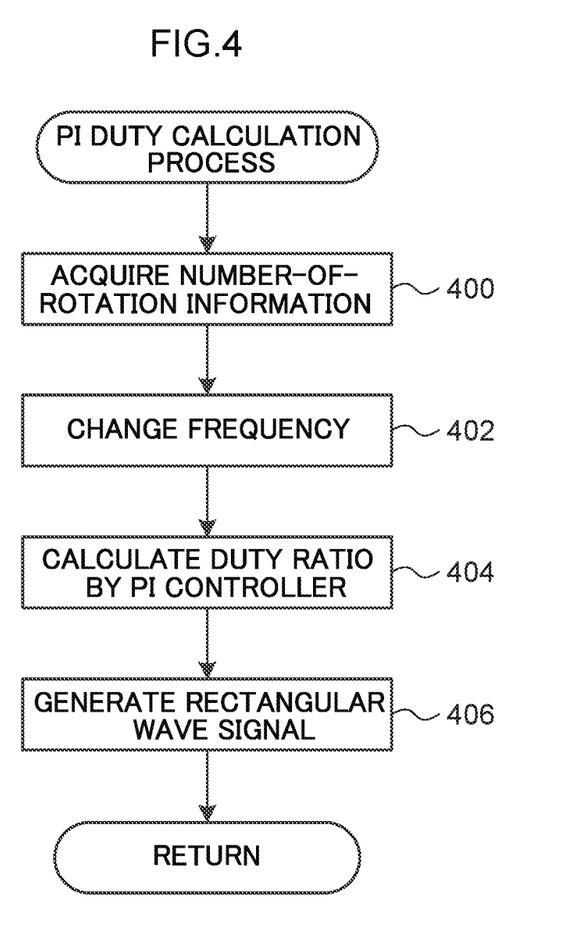
FIG. 4 is a flowchart showing an example of a PI duty calculation process in a PI duty calculation unit of the motor driving device according to the first embodiment.

FIG. 4 is a flowchart showing an example of the PI duty calculation process in the PI duty calculation unit 74 of the motor driving device 20 according to the present embodiment. The process of FIG. 4 is started when the microcomputer 32 shifts to a new control period, and returns with the end of the control period.

In step 400, a target rotation speed and an actual rotation speed calculated by the number-of-rotation information unit 72 are acquired, and in step 402, a carrier frequency is changed. As described above, a mode of changing the carrier frequency from a frequency in an immediately previous control period may change stepwise from a low frequency to a high frequency, or may change stepwise from a high frequency to a low frequency. Further, it may be randomly selected for each control period.

In step 404, the duty ratio of the voltage applied to the coil of the stator 14 is calculated by the PI controller, such that the deviation between the target rotation speed and the actual rotation speed calculated by the number-of-rotation information unit 72 is eliminated. In step 406, a rectangular wave signal related to PWM is generated based on the carrier wave signal of the frequency changed in step 402 and the duty ratio calculated in step 404, and the process is returned.

As described above, according to the present embodiment, the carrier frequency related to the generation of the rectangular wave signal indicating the duty ratio is changed for each control period of the microcomputer 32, such that it is possible to reduce the noise accompanying the PWM control. In the present embodiment, the frequency is changed by selecting one frequency from a plurality of predetermined frequencies.

In the general spread spectrum, the frequencies are randomly set from the frequency range in which the upper limit value, the intermediate value, and the lower limit value are set, but in such a control, an integrated circuit dedicated to spread spectrum is essential. In order to incorporate the integrated circuit into the existing motor driving device, it is necessary to change the circuit configuration of the motor driving device, which requires cost, time, and labor for practical application.

However, in the present embodiment, one frequency is selected from choices of a finite number of frequencies, and it can be dealt with by changing a program for operating the microcomputer 32. As a result, the integrated circuit dedicated to spread spectrum is unnecessary, and the cost, time, and labor for incorporating the integrated circuit into the existing motor driving device are not required.

In addition, in the present embodiment, a situation that the frequency before the change and the frequency after the change are almost similar can be avoided by widely setting an interval between the adjacent frequencies, for example, $f_1$ kHz, $f_2$ kHz, $f_3$ kHz, $f_4$ kHz, and $f_5$ kHz. When the frequency before the change and the frequency after the change are almost similar, sideband frequencies accompanying each of the frequency before the change and the frequency after the change are overlapped and the noise may get worse. However, as described above, it is possible to prevent the sideband frequencies from overlapping each other by widely setting the interval between the adjacent frequencies.

Second Embodiment

A second embodiment will be described below. In the first embodiment, the noise generated from the motor 52 is reduced by changing the carrier frequency related to the generation of the PWM signal for each control period of the microcomputer 32. However, when the carrier frequency related to the generation of the PWM signal is changed, the duty ratio of the voltage applied to the motor 52 may change and noise may be generated from the motor 52. In order to suppress such noise, for example, one reference frequency is determined from $f_1$ kHz, $f_2$ kHz, $f_3$ kHz, $f_4$ kHz, and $f_5$ kHz, and the voltage generated based on the PWM signal according to the frequency other than the reference frequency is made equal to the voltage generated based on the PWM signal of the period according to the reference frequency.

In the microcomputer for the motor control, like the inverter FET 44A and the inverter FET 44D, in order to prevent a through-current from flowing through the FETs connected in series, a dead time that does not turn on the FET is necessarily provided for the rectangular wave of the PWM signal. Due to the existence of the dead time, when the period of the PWM signal is different, the substantial value of the duty ratio acting on the rotation of the motor 52 changes.

Figure 5A:
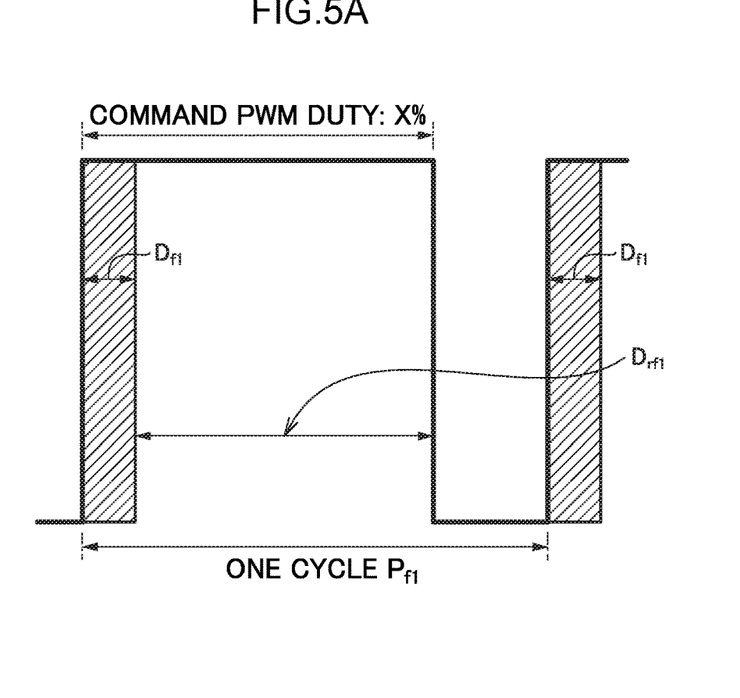
FIG. 5A is an explanatory diagram showing a PWM signal when a carrier frequency is $f_1$ kHz.
Figure 5B:
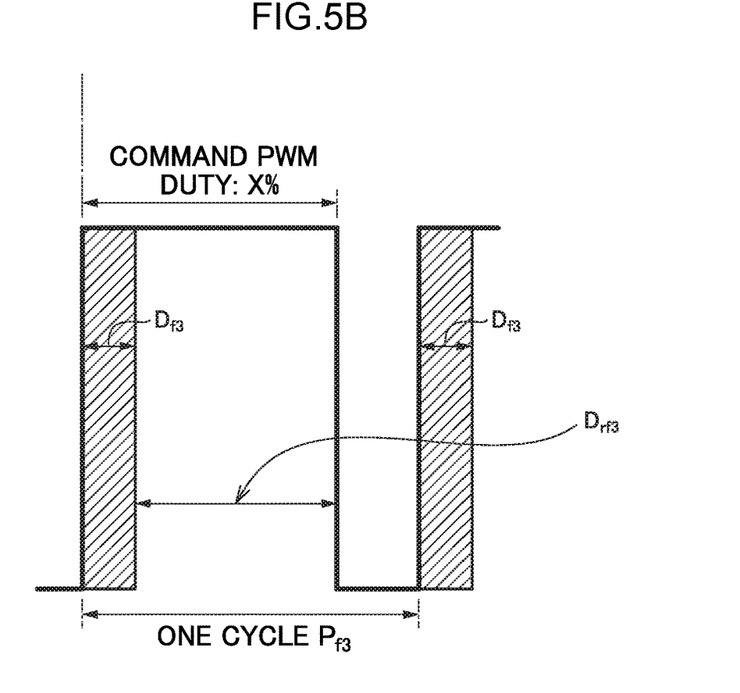
FIG. 5B is an explanatory diagram showing a PWM signal when a carrier frequency is $f_3$ kHz.

FIG. 5A shows a PWM signal when a carrier frequency is $f_1$ kHz, and FIG. 5B shows a PWM signal when a carrier frequency is $f_3$ kHz. In a case in which the carrier frequency is $f_1$ kHz, when a command PWM duty ratio is X %, a value obtained by subtracting a dead time $D_{f1}$ from a command PWM duty and dividing the result by one period $P_{f1}$ as shown in the following Equation (1) becomes a substantial PWM duty $D_{rf1}$ at the frequency $f_1$ kHz.

$$D_{rf1}=(P_{f1} \cdot X - D_{f1})/P_{f1} \tag{1}$$

In a case in which the carrier frequency is $f_3$ kHz, when a command PWM duty ratio is X %, a value obtained by subtracting a dead time $D_{f3}$ from a command PWM duty and dividing the result by one period $P_{f3}$ as shown in the following Equation (2) becomes a substantial PWM duty $D_{rf3}$ at the frequency $f_3$ kHz.

$$D_{rf3}=(P_{f3}\cdot X-D_{f3})/P_{f3} \qquad (2)$$

As shown in FIG. 5, as the carrier frequency increases, the period of the rectangular wave becomes shorter. Therefore, the influence on the substantial PWM duty due to the dead time becomes noticeable. By changing the dead time for each frequency, the influence of the dead time on the substantial PWM duty can be suppressed. However, in order to cause the microcomputer 32 to perform such control, it is necessary to change the specification of the microcomputer 32.

Figure 6:
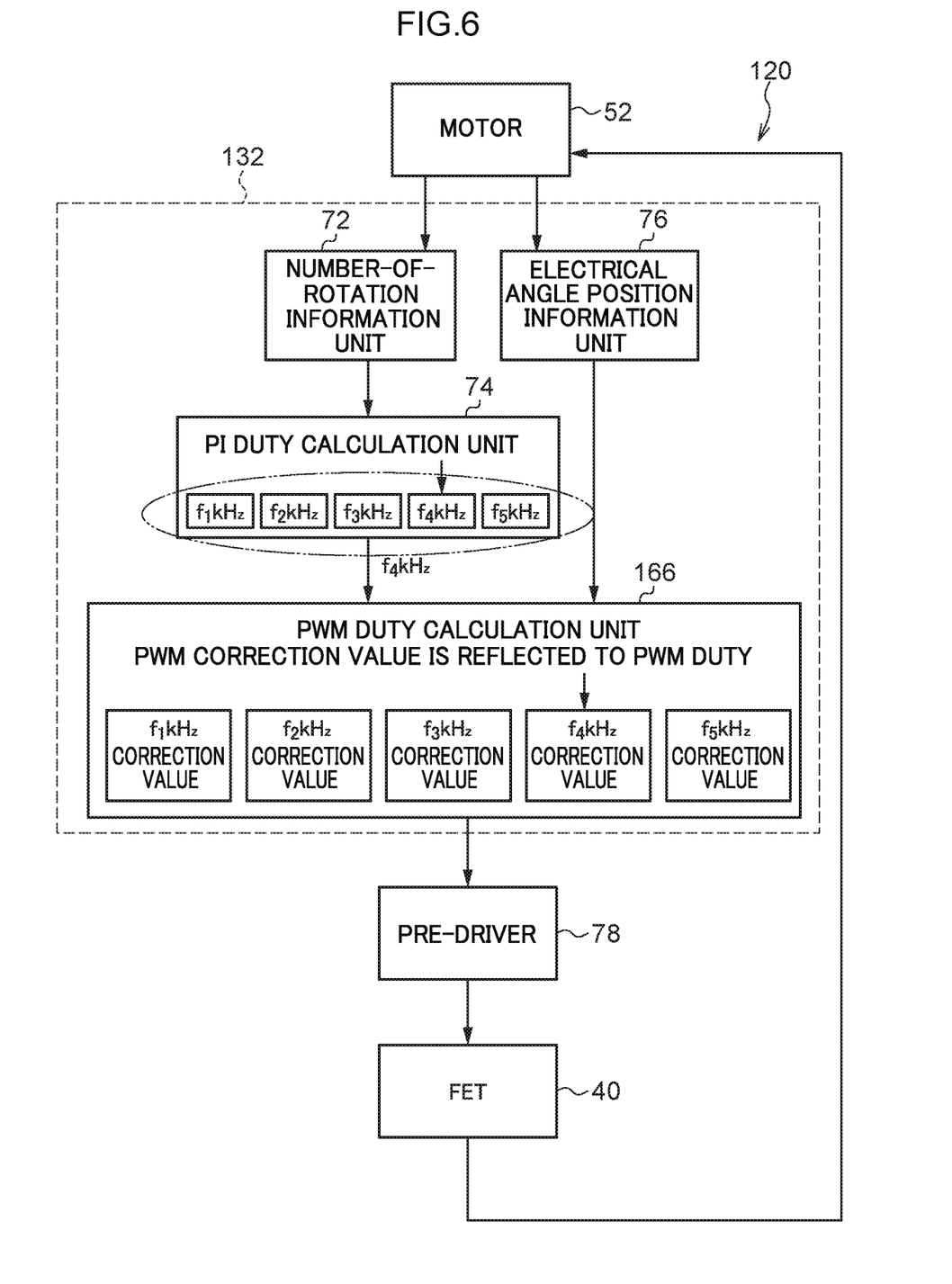
FIG. 6 is a functional block diagram of a motor driving device according to a second embodiment.

FIG. 6 is a functional block diagram of the motor driving device 120 according to the present embodiment. The motor driving device 120 according to the present embodiment differs from the first embodiment only in the PWM duty calculation unit 166, and the other configuration is the same as the first embodiment. Therefore, a detailed description of the configuration other than the PWM duty calculation unit 166 will be omitted.

In the present embodiment, a correction value for suppressing the influence on the substantial PWM duty due to the fact that the dead time is a fixed value is calculated for each frequency, and the duty ratio calculated by the PI duty calculation unit 74 is corrected with the correction value.

Figure 7:
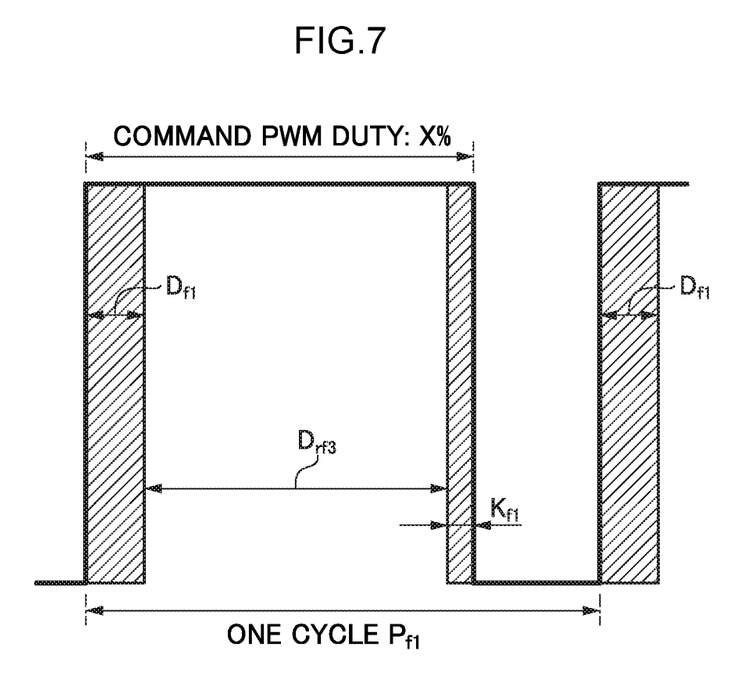
FIG. 7 is a schematic diagram showing an example of a correction of a PWM signal when a carrier frequency is $f_1$ kHz in the second embodiment.

FIG. 7 is a schematic diagram showing an example of a correction of a PWM signal when a carrier frequency is $f_1$ kHz. In the present embodiment, one of the frequencies $f_1$ kHz, $f_2$ kHz, $f_3$ kHz, $f_4$ kHz, and $f_5$ kHz is set as the reference frequency, the PWM signal at the reference frequency is regarded as having a correction value of 0, and the PWM signal at other frequencies calculates the correction value at each frequency from the viewpoint of how much difference is generated from the substantial PWM duty of the reference frequency.

As an example, in a case in which the reference frequency is $f_3$ kHz and the frequency for calculating the correction value is $f_1$ kHz, when the command PWM duty ratio is X %, the substantial PWM duty at the frequency $f_1$ kHz is expressed by Equation (1) above, and the substantial PWM duty at the frequency $f_3$ kHz is expressed by Equation (2) above. Assuming that the reference frequency is $f_3$ kHz, it is considered that the substantial PWM duty $D_{rf1}$ at the frequency $f_1$ kHz has a difference between the substantial PWM duty $D_{rf3}$ at the frequency $f_3$ kHz and the correction value $K_{f1}$ shown in FIG. 7. Therefore, the following Equation (3) is obtained.

$$(P_{f1}\cdot X-D_{f1})/P_{f1}+K_{f1}=(P_{f3}\cdot X-D_{f3})/P_{f3} \qquad (3)$$

From Equation (3) above, the correction value $K_{f1}$ is expressed by the following Equation (4).

$$K_{f1}=(P_{f3}\cdot X-D_{f3})/P_{f3}-(P_{f1}\cdot X-D_{f1})/P_{f1}=(D_{f1}/P_{f1})-(D_{f3}/P_{f3}) \qquad (4)$$

From the above, the substantial PWM duty $D_{rf1}$ at the frequency $f_1$ kHz is expressed by the following Equation (5).

$$D_{rf1}=[(P_{f1}\cdot X+\{(D_{f1}/P_{f1})-(D_{f3}/P_{f3})\}-D_{f1})/P_{f1}] \qquad (5)$$

If the control program of the microcomputer 32 is set so as to eliminate the value shown in FIG. 7 as the correction value $K_{f1}$, the substantial PWM duty $D_{rf1}$ at the frequency $f_1$ kHz can be corrected to the same value as the substantial PWM duty $D_{rf3}$ at the frequency $f_3$ kHz. In addition, the substantial PWM duty at each frequency can be calculated by changing $D_{f1}$ and $P_{f1}$ in Equations (4) and (5) to values at other frequencies. Therefore, it is possible to make the substantial PWM duty at each frequency equal without changing the hardware of the microcomputer 32 or the like.

In Equations (4) and (5) above, in consideration of the fact that the dead time at each frequency is not necessarily the same, that is, $D_{f1} \neq D_{f3}$. However, in a case in which it is guaranteed that the dead time is constant at each frequency, the calculation may be further simplified by setting $D_{f1}=D_{f3}$.

As described above, according to the present embodiment, it is possible to sequentially change the carrier frequency of the PWM without requiring the modification of the existing circuit, and even when the carrier frequency is changed, the change in the voltage applied to the motor 52 is suppressed and it is possible to stably perform the rotation control of the motor 52.

In addition, the invention is not limited to the above, and it is needless to say that various modifications can be made within the range not departing from the gist other than the above.

The disclosure of Japanese Patent Application No. 2016-041398, filed on Mar. 3, 2016, is incorporated herein by reference in its entirety.

The invention claimed is:

1. A motor driving device comprising:
   a driving unit that includes a plurality of switching elements, each of which is on or off controlled by a pulse width modulation signal, and that drives a motor with a driving voltage according to an on or off state of the plurality of switching elements; and
   a control unit (i) that repeatedly operates at a predetermined cycle, (ii) that selects at the start of operation a signal from a plurality of predetermined signals having different frequencies, (iii) that generates a pulse width modulation signal based on a command signal and the selected signal, and (iv) that controls the on or off state of the plurality of switching elements of the driving unit by using the generated pulse width modulation signal.

2. The motor driving device according to claim 1, wherein the control unit sequentially selects one different signal from the plurality of predetermined signals and, after selecting a last one of the plurality of predetermined signals, repeats to sequentially select one different signal.

3. The motor driving device according to claim 1, wherein the control unit randomly selects one signal from the plurality of predetermined signals.

4. The motor driving device according to claim 1, wherein the control unit determines one of the plurality of predetermined signals as a reference signal and corrects a pulse width modulation signal generated based on a signal other than the reference signal, such that a driving voltage generated by using the pulse width modulation signal based on the signal other than the reference signal becomes equal to a driving voltage generated by using a pulse width modulation signal based on the reference signal.

5. The motor driving device according to claim 4, wherein the control unit corrects the pulse width modulation signal based on the signal other than the reference signal, such that substantial values become equal, the substantial values being the pulse width modulation signal based on the reference signal and the pulse width modulation signal based on the signal other than the reference signal from each of which an influence of dead time is excluded.

6. The motor driving device according to claim 1, further comprising:

a rotation speed detection unit that detects a rotation speed of the motor, and wherein the control unit calculates a driving voltage of the motor so as to eliminate a deviation between a target rotation speed indicated by the command signal and an actual rotation speed of the motor detected by the rotation speed detection unit.

7. The motor driving device according to claim 1, wherein the plurality of predetermined signals comprises at least three of the predetermined signals.

8. The motor driving device according to claim 1, wherein after selecting the selected signal, the control unit selects another signal of the plurality of predetermined signals having a frequency lower than that of the selected signal.

9. A motor driving device comprising:
a driving unit that includes a plurality of switching elements, each of which is on or off controlled by a pulse width modulation signal, and that drives a motor with a driving voltage according to an on or off state of the plurality of switching elements; and
a control unit that repeatedly operates at a predetermined cycle, that generates a pulse width modulation signal based on a command signal and a signal selected from a plurality of predetermined signals having different frequencies at the start of operation, and that controls the on or off state of the plurality of switching elements of the driving unit by using the generated pulse width modulation signal,
wherein the control unit determines one of the plurality of predetermined signals as a reference signal and corrects a pulse width modulation signal generated based on a signal other than the reference signal, such that a driving voltage generated by using the pulse width modulation signal based on the signal other than the reference signal becomes equal to a driving voltage generated by using a pulse width modulation signal based on the reference signal.

10. The motor driving device according to claim 9, wherein the control unit corrects the pulse width modulation signal based on the signal other than the reference signal, such that substantial values become equal, the substantial values being the pulse width modulation signal based on the reference signal and the pulse width modulation signal based on the signal other than the reference signal from each of which an influence of dead time is excluded.

* * * * *